United States Patent [19]
Burk, Jr.

[11] 3,826,448
[45] July 30, 1974

[54] DEPLOYABLE FLEXIBLE VENTRAL FINS FOR USE AS AN EMERGENCY SPIN-RECOVERY DEVICE IN AIRCRAFT

[75] Inventor: Sanger M. Burk, Jr., Newport News, Va.

[73] Assignee: The United States of America as represented by the Administrator of the National Aeronautics and Space Administration, Washington, D.C.

[22] Filed: Sept. 14, 1972

[21] Appl. No.: 289,018

[52] U.S. Cl................ 244/91, 244/327, 244/90 R
[51] Int. Cl............................................ B64c 5/12
[58] Field of Search............ 244/91, 87, 90 R, 90 B, 244/96, 113, DIG. 1, 3.24, 3.27, 3.28, 3.29, 3.30

[56] References Cited
UNITED STATES PATENTS

| | | | |
|---|---|---|---|
| 1,243,542 | 10/1917 | Moore | 244/3.27 |
| 2,999,657 | 9/1961 | Clark | 244/91 |
| 3,098,630 | 7/1963 | Connors | 244/113 |
| 3,165,281 | 1/1965 | Gohlke | 244/3.29 X |
| 3,185,412 | 5/1965 | Rogallo | 244/DIG. 1 |
| 3,633,846 | 1/1972 | Biggs | 244/3.27 |

*Primary Examiner*—Trygve M. Blix
*Assistant Examiner*—Barry L. Kelmachter
*Attorney, Agent, or Firm*—Howard J. Osborn; Wallace J. Nelson; John R. Manning

[57] ABSTRACT

A flexible fin device for mounting on an aircraft to effect spin recovery. The device may be selectively deployed to provide a triangular planform of flexible material to provide spin recovery, and retracted for compact storage during non-use. A single flexible fin may be deflected in a specific direction depending on direction of spin rotation, or two flexible fins forming an inverted "V" configuration may be used according to the invention. The device may be mounted on the underbody of the aircraft.

5 Claims, 12 Drawing Figures

DEPLOYABLE FLEXIBLE VENTRAL FINS FOR USE AS AN EMERGENCY SPIN-RECOVERY DEVICE IN AIRCRAFT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to a flexible ventral fin device which may be deployed when necessary to function as an emergency spin-recovery device for use with aircraft.

2. Description of the Prior Art

Emergency spin-recovery devices utilized in the event aircraft spin cannot be terminated by the use of aircraft control surfaces are known in the art. Such devices are especially required during flight demonstrations to permit aircraft spin-recovery when conducting tests to determine if the aircraft will satisfactorily recover from spins.

One prior art device extensively used in emergency spin-recovery is a tail-mounted parachute. However, inasmuch as the parachute trails above an aircraft in a spin, it is possible that the parachute will not properly inflate because of the blanketing effect of aircraft wake. Further, because the parachute canopy is dependent upon aerodynamic forces which are generally small to open it, the parachute is susceptible to malfunctions caused by improper packing techniques, mechanical defects, and weight effects. The use of a tail-mounted parachute to produce an antispin yawing moment effective to terminate a spin also causes a very large nose-down pitching moment to be produced which may retard the spin recoveries of certain types of aircraft, and aircraft structures must be strengthened considerably at considerable expense to withstand this pitching moment.

Another type of emergency spin-recovery device involves the use of rockets. However inasmuch as the duration of rocket thrust is limited, it is possible that the aircraft may not have recovered from a spin before the rocket fuel is exhausted. Further, the aircraft may recover from a spin in one direction and then enter a spin in the opposite direction if the thurst is not terminated immediately upon cessation of spin rotation.

Small fixed ventral fins have been used effectively on small, light private airplanes to improve the spin recovery characteristics thereof but, because their size is limited by ground-clearance requirements, prior art type ventral fins have generally been ineffective on fighter and attack airplanes. Further prior art ventral fins made of rigid materials cannot be retracted easily for stowage, and thus are small in size to minimize their effect on performance characteristics of the aircraft.

The deployment of flexible materials for use in conjunction with aircraft to perform certain functions is also known in the art. The Connors U.S. Pat. No. 3,098,630 discloses an annular supersonic decellerator which may be deployed, having support arms for an annulus of metallic fabric pivotted together and erected in response to the movement of a central arm. The Rogallo U.S. Pat. No. 3,185,412 discloses a flexible wing vehicle wherein a wing of flexible material is deployed through erection of support struts which are moveable in response to spreader links.

SUMMARY OF THE DISCLOSURE

The deficiencies and disadvantages of the prior art are solved by the instant invention which relates to flexible ventral fins deployable for the purpose of spin-recovery of aircraft. The ventral fins according to the invention are deployable to form a triangular planform covered with a flexible material such as nylon fabric. Rigid members are secured to two sides of the triangle, and a spreader bar mechanism is attached to the rigid members. The spreader bar mechanism comprises first and second arms, one end of the first and second arms being pivotally attached to respective rigid members, the other ends of the first and second arms being pivotally attached to each other. An actuator mechanism is coupled to the pivotal connection of the two other ends of the arms and is operable to deploy the ventral fins to a spin-recovery position wherein the fabric forms a substantially triangular shape, and to a stowage position to retract the ventral fins in packaged form for stowage during non-use.

The ventral fin device may be mounted externally beneath the airplane fuselage or mounted inside the bottom of the fuselage for streamlining purposes. One embodiment includes a single ventral fin that can be deflected a certain amount in a direction to oppose the spin. Another embodiment includes two single ventral fins joined together to form an inverted "V", which need not be deflected.

The flexible ventral fin device according to the invention provides the following advantages:

1. it is always in free-stream air in a spin because it is attached beneath the aircraft fuselage;
2. it is deployable positively by mechanical means;
3. the magnitude of the aerodynamic pitching produced by it is small;
4. it is not consumed during use, and it therefore does not have a set use period as a rocket does; and,
5. it is reusable.

DETAILED DESCRIPTION OF THE DISCLOSURE

Figure 1A:
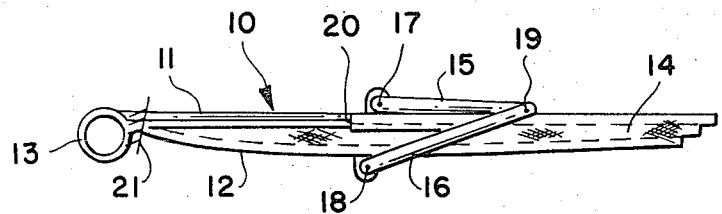
FIGS. 1(a), 1(b) and 1(c) show a ventral fin, which is in retracted position in FIG. 1(a), partially retracted in FIG. 1(b), and in deployed position in FIG. 1(c).
Figure 1B:
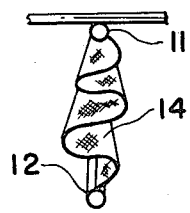
Figure 1C:
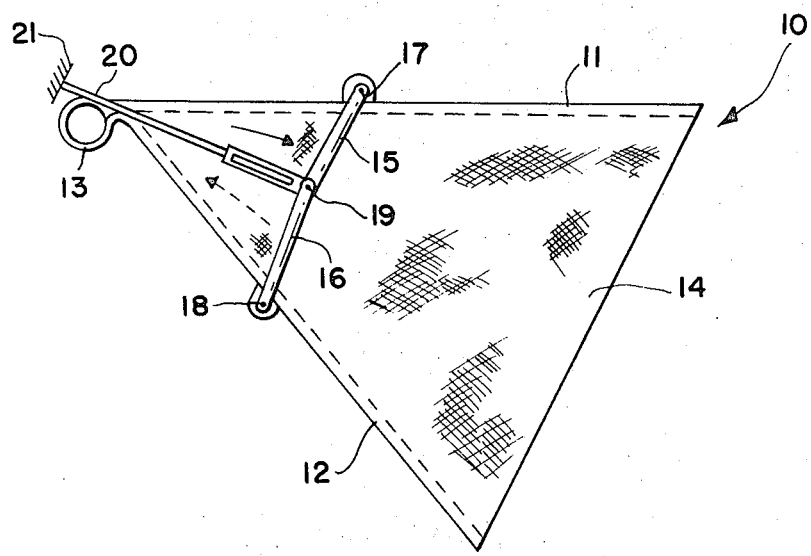

FIGS. 1(a), 1(b) and 1(c) show a deployable ventral fin device according to the invention, with FIG. 1(a) showing the device in retracted position for stowage, FIG. 1(b) showing the fin in partially retracted position, and FIG. 1(c) showing the device in deployed position. The ventral fin device 10 comprises a triangular planform including rigid support members 11 and 12 pinned together by pin device 13 at their connecting ends. Flexible material 14 may comprise a material such as nylon fabric which is easily foldable and is securely attached to rigid support members 11 and 12.

Arms 15 and 16 are respectively connected by pin means 17 and 18 to rigid members 11 and 12. The other ends of arms 15 and 16 are pinned together by pin means 19 to form a spreader bar mechanism, which is connected in hinged manner to actuator device 20. The actuator device 20 is fixed at end 21 and comprises an extendable portion that may be retracted (from the position shown in FIG. 1a to that shown in FIGS. 1b and 1c) and in the broken line arrow direction in FIG. 1(c) to spread arms 15 and 16 apart to deploy the ventral fin as shown in FIGS. 1(b) and 1c. The extendable portion may be extended in the direction shown by the solid line arrow of FIG. 1(c) to retract the ventral fin to the retracted position shown in FIG. 1(a). Power means (not shown) which are conventional in the art may be utilized to operate actuator 20 to retract or deploy ventral fin 10 as required. FIG. 1(c) is a right side view of the ventral fin device in the deployed condition whereas FIG. 1(b) is a rear view of the fin in a partially retracted condition to show the accordian folding of the fabric.

Figure 2A:
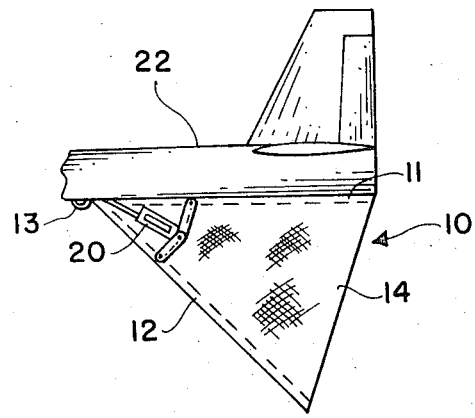
FIGS. 2(a), 2(b) and 2(c) show different views of a single ventral fin device according to the invention in deployed condition.
Figure 2B:
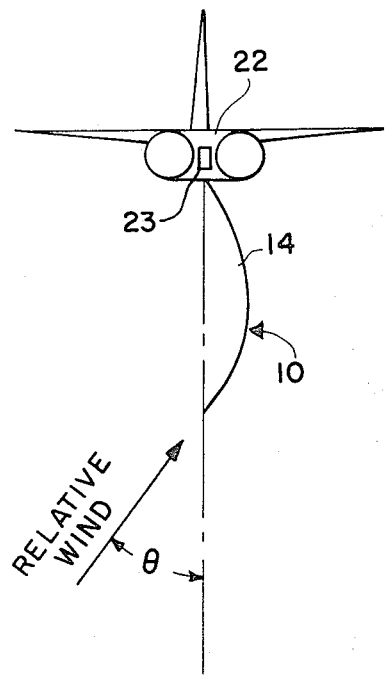
Figure 2C:
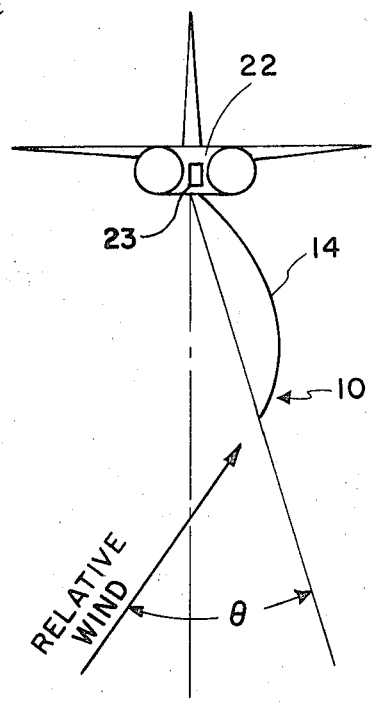

One application of the ventral fin according to the invention is shown in FIGS. 2(a) and 2(b), with FIG. 2(a) being a side view of a single ventral fin 10 mounted at the rear underbody of an airplane 22 in deployed condition. FIG. 2(b) is a rear view of the airplane showing the single ventral fin 10 of FIG. 2(a) in an undeflected position and FIG. 2(c) is a rear view of the fin deflected from the vertical center axis of the airplane by angle θ. The actuator means 20, may be fixed to the aircraft, and rigid member 11 and pin device 13 may also be secured thereto. When a single ventral fin is used as shown in FIGS. 2(a) and 2(b) it is necessary to deflect the ventral fin from the vertical center axis of the airplane in a direction to oppose the spin. Thus right deflection is required for a right spin and left deflection is required for a left spin. Under such circumstances the pilot or an automatic sensor device must determine the direction of spin rotation to effect the correct fin deflection, which may be produced by conventional power means as represented by block 23. Fin deflection in either right or left direction may be accomplished by conventional structure such, for example, as that shown in FIGS. 17 and 18 of the Rogallo patent discussed above.

The spreader bar mechanism disclosed not only functions to deploy and retract the ventral fin device, but also functions to stiffen the fabric material 14 of the deployed ventral fin which results in improved spin recoveries. FIGS. 2(b) and 2(c) are rear views of the airplane of FIG. 2(a) showing that the wind direction may produce curvature of the ventral-fin fabric.

Figure 3A:
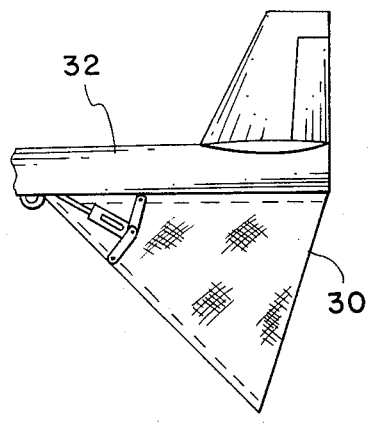
FIGS. 3(a) and 3(b) show different views of an inverted "V" ventral fin device according to the invention.
Figure 3B:
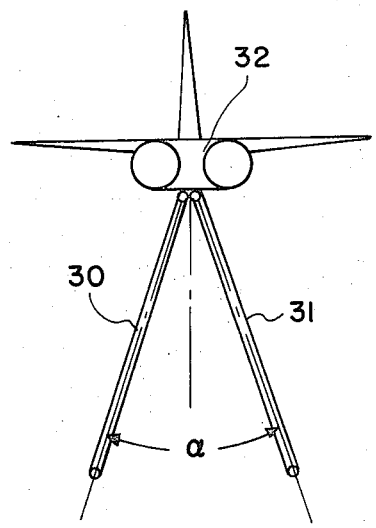

FIGS. 3(a) and 3(b) illustrate another embodiment of the invention wherein two ventral fin devices of FIGS. 1(a), 1(b) and 1(c) are employed for forming an inverted "V" configuration connected to the underbody of an airplane 32. The use of the inverted "V" type of ventral fin device eliminates the necessity that the pilot or a sensor must determine the direction of spin rotation since it is not necessary to move the fins; the fins already have a prefixed angle when they are deployed. The inverted "V" ventral fin device is shown in deployed condition as a side view of the airplane in FIG. 3(a) and in deployed condition as a front view of the airplane in FIG. 3(b). In actual test conditions, angles of approximately 40° formed by the fins were found to result in satisfactory spin recoveries.

Figure 6A:
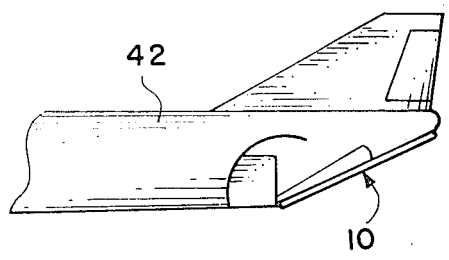
FIGS. 6(a) and 6(b) show a single ventral fin device in retracted and deployed condition respectively mounted in an alternate location on the underbody of a McDonnel F-4 airplane.
Figure 6B:
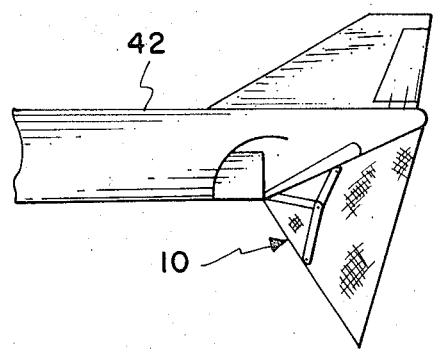
Figure 4:
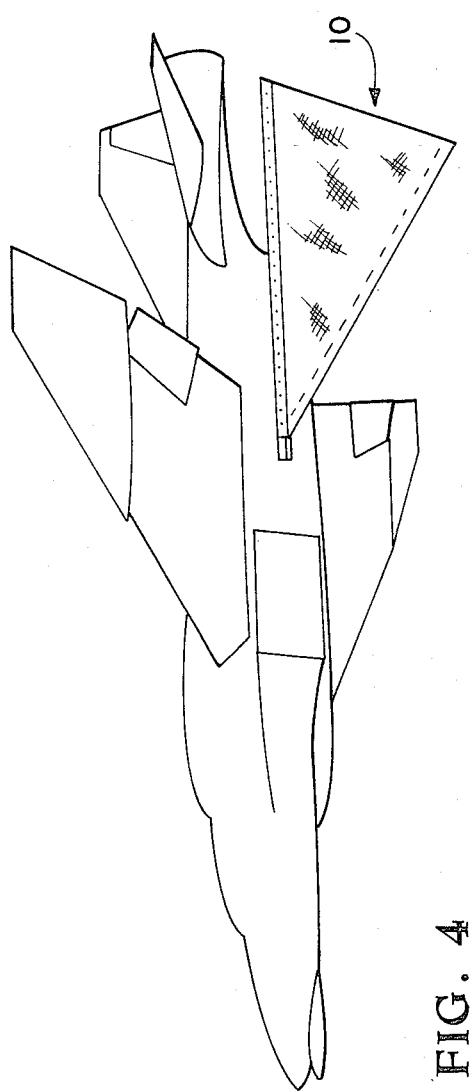
FIG. 4 shows one possible location for a single ventral fin device according to the invention installed on a McDonnel F-4 airplane.
Figure 5:
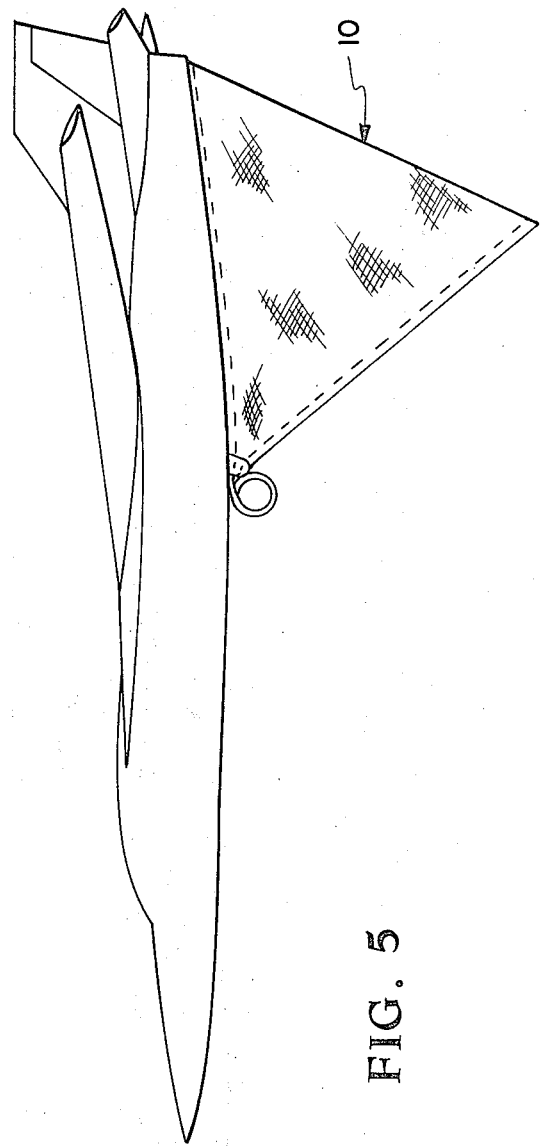
FIG. 5 shows one possible location for a single ventral fin device according to the invention installed on a General Dynamics F-111A airplane.

FIGS. 4 and 5 show single ventral fin devices 10 according to the invention installed on models of the McDonnel F-4 airplane and the General Dynamics F-111A airplane respectively. An alternate location for a single ventral fin 10 mounted on a McDonnel F-4 airplane 42 is shown in FIGS. 6(a) and 6(b) with FIG. 6(a) showing the retracted position and FIG. 6(b) showing the deployed position.

When the ventral fin device according to the invention is retracted for stowage, the two rigid members 11 and 12 of FIGS. 1(a) and 1(b) are nestled side by side prior to spin entry. Then as they are needed, the device is deployed by actuating the spreader mechanism to deploy or spread out fabric 14 as shown in FIG. 1(e). After spin recovery the device is retracted for stowage and used again as required. Consequently the stowage volume required is minimized and may be even further reduced by folding or telescoping of the device. Depending upon the aircraft utilized, other locations of the ventral fin device may be appropriate as for example near the nose of the aircraft, on the bottom or top, or at the rear of the aircraft as a dorsal fin.

Although the invention has been described relative to a particular embodiment thereof, there are obviously numerous variations and modifications readily apparent to those skilled in the art in the light of the above teachings. It is therefore to be understood that the invention may be practiced otherwise than as specifically described.

What is claimed is:

1. An emergency spin recovery device for use with an aircraft comprising:
   at least one flexible fin mounted on the aircraft and having a retracted position wherein the flexible fin is compactly packaged for stowage, and a deployed position wherein the flexible fin is deployed for spin recovery of the aircraft;
   actuating means connected to said at least one flexible fin to selectively actuate it to the retracted and deployed positions,
   said flexible fin comprising first and second rigid members, each having first ends pinned together, a triangular shaped flexible fabric material with adjoining first and second sides secured to said first and second rigid members, respectively, and said actuating means comprises a spreader mechanism attached to said first and second rigid members to spread them apart about their pinned first ends to the deployed position wherein the flexible fabric material has a triangular planform, and to retract them to the retracted position wherein said first and second rigid members are nestled side-by-side and said flexible fabric material is stored therebetween in folded accordian configuration.

2. An emergency spin recovery device for use with an aircraft as recited in claim 1 wherein said at least one flexible fin consists of:

first and second flexible fins mounted on the underbody of the aircraft forming a predetermined angle therebetween to provide an inverted "V" configuration in a plane substantially parallel to the frontal plane of the aircraft, each of said first and second flexible fins having a retracted position wherein the flexible fin is compactly packaged for stowage, and a deployed position wherein the flexible fin is deployed for spin recovery of the aircraft, and, actuating means connected to said first and second flexible fins to selectively actuate them to the retracted and deployed positions.

3. An emergency spin recovery device for use with an aircraft as recited in claim 1 wherein said at least one flexible fin is mounted on the rear underbody of the aircraft.

4. An emergency spin recovery device for use with an aircraft as recited in claim 3 further comprising:

means to deflect said flexible fin in a selected direction to terminate left and right spin rotation of the aircraft.

5. An emergency spin recovery device for use with an aircraft as recited in claim 3 wherein said triangular planform of said deployed flexible fin is deflected somewhat from a vertical plane passing through the longitudinal axis of the aircraft.

* * * * *